(12) United States Patent
Tan et al.

(10) Patent No.: US 12,150,092 B2
(45) Date of Patent: Nov. 19, 2024

(54) INFORMATION TRANSMISSION METHOD AND APPARATUS, COMMUNICATION NODE, AND STORAGE MEDIUM

(71) Applicant: ZTE Corporation, Guangdong (CN)

(72) Inventors: Jie Tan, Guangdong (CN); Xiubin Sha, Guangdong (CN); Jianxun Ai, Guangdong (CN); Bo Dai, Guangdong (CN); He Huang, Guangdong (CN); Yin Gao, Guangdong (CN); Jing Liu, Guangdong (CN); Yuan Gao, Guangdong (CN); Ting Lu, Guangdong (CN); Zijiang Ma, Guangdong (CN)

(73) Assignee: ZTE Corporation, Shenzhen (CN)

( * ) Notice: Subject to any disclaimer, the term of this patent is extended or adjusted under 35 U.S.C. 154(b) by 144 days.

(21) Appl. No.: 18/090,377

(22) Filed: Dec. 28, 2022

(65) Prior Publication Data

US 2023/0144654 A1 May 11, 2023

Related U.S. Application Data

(63) Continuation of application No. PCT/CN2022/074669, filed on Jan. 28, 2022.

(30) Foreign Application Priority Data

Apr. 29, 2021 (CN) .......................... 202110476901.8

(51) Int. Cl.
*H04W 68/02* (2009.01)
*H04W 8/24* (2009.01)
*H04W 76/28* (2018.01)

(52) U.S. Cl.
CPC ............. *H04W 68/02* (2013.01); *H04W 8/24* (2013.01); *H04W 76/28* (2018.02)

(58) Field of Classification Search
CPC ....... H04W 68/02; H04W 8/24; H04W 76/28; H04W 68/005; H04W 52/0216;
(Continued)

(56) References Cited

U.S. PATENT DOCUMENTS 11,228,899 B2   1/2022  Ou et al.
2019/0342833 A1* 11/2019  Åström ................... H04W 8/24
(Continued)

FOREIGN PATENT DOCUMENTS

CN    109548143 A    3/2019
CN    112075104 A    12/2020
(Continued)

OTHER PUBLICATIONS

3GPP TS 38.304 V16.3.0 User Equipment (UE) procedures in Idle mode and RRC Inactive state (Dec. 2020) (Year: 2020).*
(Continued)

*Primary Examiner* — Nizar N Sivji
(74) *Attorney, Agent, or Firm* — Perkins Coie LLP (57) ABSTRACT

Provided are an information transmission method and apparatus, a communication node, and a storage medium. The information transmission method applied to a first communication node includes the followings: determining paging capability indication information, where the paging capability indication information indicates the paging capability of the first communication node in an inactive state, and transmitting the paging capability indication information to a third communication node. The paging mechanism in the inactive state is effectively determined by using the method.

19 Claims, 5 Drawing Sheets

(58) Field of Classification Search
CPC . H04W 76/27; H04W 68/00; H04W 52/0212; H04L 5/0091; Y02D 30/70
See application file for complete search history.

(56) References Cited

U.S. PATENT DOCUMENTS

| | | | | |
|---|---|---|---|---|
| 2020/0396591 | A1* | 12/2020 | Ou | H04W 76/30 |
| 2021/0212153 | A1* | 7/2021 | Siomina | H04W 76/28 |
| 2022/0053421 | A1* | 2/2022 | Zheng | H04W 52/0229 |
| 2022/0110091 | A1 | 4/2022 | Li et al. | |
| 2023/0063026 | A1* | 3/2023 | Reial | H04W 52/0235 |
| 2023/0319718 | A1* | 10/2023 | Li | H04W 52/0235 370/311 |
| 2023/0354198 | A1* | 11/2023 | Nader | H04W 52/0229 |

FOREIGN PATENT DOCUMENTS

| | | | |
|---|---|---|---|
| CN | 112087748 A | 12/2020 | |
| CN | 112087795 A | 12/2020 | |
| WO | WO-2019084923 A1 * | 5/2019 | H04L 5/0053 |

OTHER PUBLICATIONS

3GPP TSG-RAN WG3 Meeting #111-e R3-210339 Jan. 25-Feb. 5, 2021 (Year: 2021).*
3GPP TSG-RAN WG3 Meeting#111-e R3-210338 Jan. 25-Feb. 5, 2021 (Year: 2021).*
3GPP TS 38.304 V15.3.0 User Equipment (UE) procedures in Idle mode and RRC Inactive state (Mar. 2019) (Year: 2019).*
On the Flexible and Performance-Enhanced Radio Resource Control for 5G NR networks—2019 (Year: 2019).*
3GPP TSG-RAN WG3 Meeting #111-e R3-210339—Feb. 2021 (Year: 2021).*
3GPP TSG-RAN WG3 Meeting#111-e R3-210338 Title Use of the UE's Radio Capability for Paging in RRC_INACTIVE—Feb. 2021 (Year: 2021).*
Japanese Office Action issued in JP Patent Application No. 2022-581695, dated Dec. 14, 2023, 3 pages. English translation included.
Written Opinion issued in International Patent Application No. PCT/CN2022/074669, mailed on Apr. 19, 2022, 8 pages. English translation included.
International Preliminary Report on Patentability issued in International Patent Application No. PCT/CN2022/074669, mailed on Oct. 24, 2023, 5 pages.
European Search Report issued in EP Patent Application No. 22794235.6, dated Dec. 19, 2023, 13 pages.
Xiaomi, "Paging enhancements for power saving," 3GPP TSG RAN WG1 #104b, R1-2103768, e-Meeting, Apr. 12-20, 2021, 12 pages.
Japanese notice of allowance issued in JP Patent Application No. 2022-581695, dated May 7, 2024, 3 pages. English translation included.
International Search Report in International Application No. PCT/CN2022/074669, mailed on Apr. 19, 2022, 11 pages with translation.
Qualcomm Incorporated et al., "Use of the UE's Radio Capability for Paging in RRC_Inactive," 3GPP TSG-RAN WG3 Meeting#111-e, R3-210338, Jan. 25-Feb. 5, 2021, 4 pages.
Qualcomm Incorporated et al., "Supporting use of UE Radio Capability for Paging in RRC_Inactive," 3GPP TSG-RAN WG3 Meeting #111-e, R3-210339, Jan. 25-Feb. 5, 2021, 5 pages.
Chinese office action issued in CN Patent Application No. 202410236683.4, dated Aug. 29, 2024, 12 pages. English translation included.

* cited by examiner

INFORMATION TRANSMISSION METHOD AND APPARATUS, COMMUNICATION NODE, AND STORAGE MEDIUM

CROSS-REFERENCE TO RELATED APPLICATIONS

This application is a continuation of International Patent Application No. PCT/CN2022/074669, filed Jan. 28, 2022, which claims priority to Chinese Patent Application No. 202110476901.8 filed with the China National Intellectual Property Administration (CNIPA) on Apr. 29, 2021, the disclosure of each of which is incorporated herein by reference in its entirety.

TECHNICAL FIELD

The present application relates to the field of communications, for example, an information transmission method and apparatus, a communication node, and a storage medium.

BACKGROUND

Radio resource control (RRC) under new radio (NR) access technology has three states: an idle state (that is, RRC_IDLE), an inactive state ((that is, RRC_INACTIVE), and a connected state (that is, RRC_CONNECTED).

Currently, a network-side device may send paging to a user equipment (UE) in the idle state or the connected state, but there is no paging mechanism in the inactive state.

SUMMARY

Embodiments of the present application provide an information transmission method and apparatus, a communication node, and a storage medium to effectively determine a paging mechanism in the inactive state.

In a first aspect, an embodiment of the present application provides an information transmission method applied to a first communication node. The method includes the following: determining paging capability indication information, where the paging capability indication information indicates paging capability of the first communication node in an inactive state, and transmitting the paging capability indication information to a third communication node.

In a second aspect, an embodiment of the present application provides an information transmission method applied to a third communication node. The method includes the following: acquiring paging capability indication information from a first communication node, where the paging capability indication information indicates paging capability of the first communication node in an inactive state, and transmitting first paging information to a second communication node. The first paging information includes the paging capability indication information.

In a third aspect, an embodiment of the present application provides an information transmission method applied to a second communication node. The method includes the following: acquiring second paging information, where the second paging information includes paging capability indication information of a first communication node, and determining a paging occasion according to the second paging information and capability information of the second communication node.

In a fourth aspect, an embodiment of the present application provides an information transmission method. The method includes determining a paging cycle of a radio access network (RAN) and transmitting the paging cycle of the RAN.

In a fifth aspect, an embodiment of the present application provides an information transmission method applied to a second communication node. The method includes, in response to acquiring a context release command of a first communication node sent by a third communication node and the first communication node in an inactive RRC state, transmitting indication information.

In a sixth aspect, an embodiment of the present application provides an information transmission method applied to a third communication node. The method includes sending a context release command of a first communication node to a second communication node and acquiring indication information.

In a seventh aspect, an embodiment of the present application provides an information transmission apparatus configured in a first communication node. The apparatus includes a determination module and a transmission module.

The determination module is configured to determine paging capability indication information. The paging capability indication information indicates paging capability of the first communication node in an inactive state.

The transmission module is configured to transmit the paging capability indication information to a third communication node.

In an eighth aspect, an embodiment of the present application provides an information transmission apparatus configured in a third communication node. The apparatus includes an acquisition module and a transmission module.

The acquisition module is configured to acquire paging capability indication information from a first communication node. The paging capability indication information indicates paging capability of a first communication node in an inactive state.

The transmission module is configured to transmit first paging information to a second communication node. The first paging information includes the paging capability indication information.

In a ninth aspect, an embodiment of the present application provides an information transmission apparatus configured in a second communication node. The apparatus includes an acquisition module and a determination module.

The acquisition module is configured to acquire second paging information. The second paging information includes paging capability indication information of a first communication node.

The determination module is configured to determine a paging occasion according to the second paging information and capability information of the second communication node.

In a tenth aspect, an embodiment of the present application provides a communication node.

The communication node includes one or more processors and a storage apparatus.

The storage apparatus is configured to store one or more programs.

When executed by the one or more processors, the one or more programs cause the one or more processors to implement the information transmission method according to any embodiment of the present application.

In an eleventh aspect, an embodiment of the present application provides a storage medium storing a computer program which, when executed by a processor, implements the information transmission method according to any embodiment of the present application.

The preceding embodiments and other aspects of the present application and implementations thereof are described in more detail in the brief description of drawings, detailed description, and claims.

DETAILED DESCRIPTION

To illustrate the object, solutions, and advantages of the present application clearer, embodiments of the present application are described hereinafter in detail in conjunction with the drawings. It is to be noted that if not in collision, embodiments of the present application and features therein may be combined with each other in any manner.

The steps illustrated in the flowcharts among the drawings may be executed by, for example, a computer system capable of executing a set of computer-executable instructions. Moreover, although logical sequences are illustrated in the flowcharts, the steps illustrated or described may be executed in a sequence different from those described here in some cases.

Figure 1:
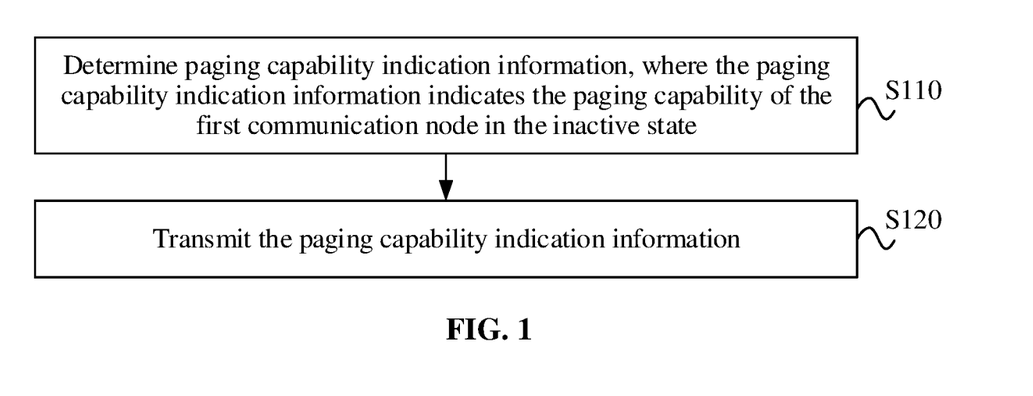
FIG. 1 is a flowchart of an information transmission method according to an embodiment of the present application.

In an example embodiment, FIG. 1 is a flowchart of an information transmission method according to an embodiment of the present application. This method may be applicable to the case where the paging mechanism of a first communication node in the inactive state is determined. This method may be implemented by software and/or hardware and integrated on the first communication node. The first communication node may be a UE.

It is to be noted that the techniques used for computing a paging occasion index in this embodiment of the present application are also applicable to computing a paging narrowband (PNB) index and a group index of a wake-up signal group (WG). That is, the PNB index, the WG index, and the paging occasion index may be computed by using a discontinuous reception cycle in an idle mode.

As shown in FIG. 1, the information transmission method provided in this embodiment of the present application includes the following steps.

In S110, paging capability indication information is determined. The paging capability indication information indicates paging capability of the first communication node in the inactive state.

Herein, it is not limited that how the paging capability of the first communication node is determined as long as the paging capability indication information can indicate the paging capability of the first communication node. For example, the paging capability indication information may indicate whether a paging occasion index in an inactive state can be computed by using the discontinuous reception cycle of the first communication node in an idle mode.

The paging capability indication information may instruct a second communication node to determine a paging occasion. The second communication node may be a base station.

In S120, the paging capability indication information is transmitted.

After the paging capability indication information is determined, the paging capability indication information may be transmitted in this step. For example, the paging capability indication information is transmitted to a third communication node to facilitate the computation of the paging occasion. The third communication node may be a core network.

In the information transmission method provided by this embodiment of the present application, the paging capability indication information is determined, where the paging capability indication information indicates the paging capability of the first communication node in the inactive state, and the paging capability indication information is transmitted. Determination of the paging mechanism in the inactive state can be facilitated based on the transmitted paging capability indication information.

On the basis of the preceding embodiment, variant embodiments of the preceding embodiment are proposed. It is to be noted here that for ease of description, only differences from the preceding embodiment are described in the variant embodiments.

In an embodiment, the paging capability of the first communication node in the inactive state includes at least one of the following: a capability of computing a paging occasion index in the inactive state by using the discontinuous reception cycle of the first communication node in an idle mode or a capability of computing a paging occasion index in an inactive state.

In an embodiment, the capability of computing the paging occasion index in the inactive state includes, in the case where the paging occasion index in the inactive state is greater than 1, the capability of computing the paging occasion index by using the discontinuous reception cycle of the first communication node in the idle mode, or, in the case where the paging occasion index in the inactive state is greater than 1, a capability of computing the paging occasion index.

The capability of computing the paging occasion index in the case where the paging occasion index in the inactive state is greater than 1 may be the capability of computing the paging occasion index by using the discontinuous reception cycle of the first communication node in the idle mode.

In an embodiment, the discontinuous reception cycle of the first communication node in the idle mode is determined by the minimum cycle in a specific paging cycle of the first communication node and a default paging cycle of a second communication node.

The specific paging cycle is not limited. Exemplarily, the specific paging cycle may be the paging cycle assigned by an upper layer.

Figure 2:
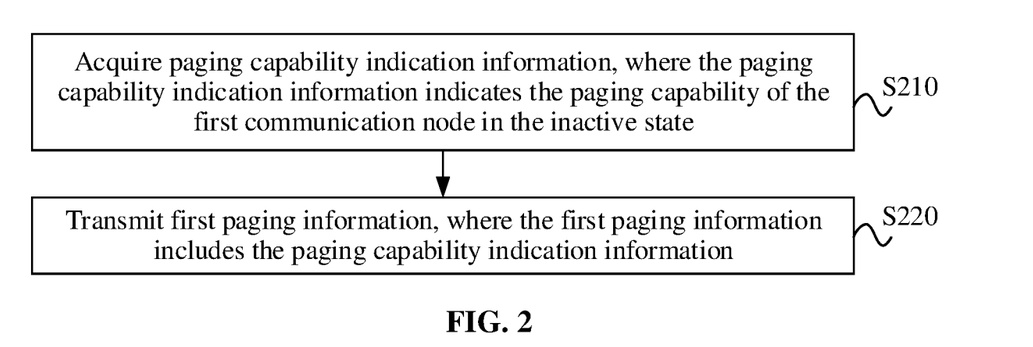
FIG. 2 is a flowchart of another information transmission method according to an embodiment of the present application.

In an example embodiment, the present application also provides an information transmission method. FIG. 2 is a flowchart of another information transmission method according to an embodiment of the present application. This method may be applicable to the case where the paging mechanism of the first communication node in the inactive state is determined. This method may be implemented by software and/or hardware and integrated on a third communication node. The third communication node may be a core network. For the content that is not yet exhaustive in this embodiment, reference may be made to the preceding embodiments. Details are not described herein.

As shown in FIG. 2, the information transmission method provided in this embodiment of the present application includes the following steps.

In S210, paging capability indication information is acquired. The paging capability indication information indicates the paging capability of the first communication node in the inactive state.

In this step, the paging capability indication information may be acquired from the first communication node.

In S220, first paging information is transmitted. The first paging information includes the paging capability indication information.

After the paging capability indication information is acquired, in this step, the paging capability indication information may be included in the first paging information for transmission so as to determine a paging occasion. In this step, the first paging information may be transmitted to the second communication node for the second communication node to determine the paging occasion.

The paging capability indication information included in the first paging information is used for the second communication node to determine the paging occasion.

In the information transmission method provided by this embodiment of the present application, the paging capability indication information is acquired, where the paging capability indication information indicates the paging capability of the first communication node in the inactive state, and the first paging information is transmitted. The first paging information includes the paging capability indication information. By transmitting the first paging information, it is convenient to determine the paging occasion based on the paging capability indication information.

On the basis of the preceding embodiments, variant embodiments of the preceding embodiments are proposed. It is to be noted here that for ease of description, only differences from the preceding embodiments are described in the variant embodiments.

In an embodiment, the paging capability of the first communication node in the inactive state includes at least one of the following: a capability of computing a paging occasion index in the inactive state by using the discontinuous reception cycle of the first communication node in the idle mode or the capability of computing the paging occasion index in the inactive state.

Figure 3A:
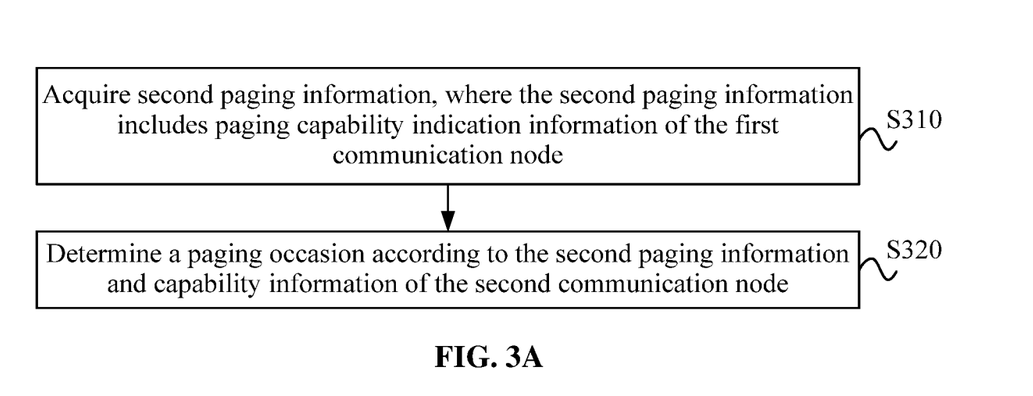
FIG. 3A is a flowchart of another information transmission method according to an embodiment of the present application.

In an example embodiment, the present application provides an information transmission method. FIG. 3A is a flowchart of another information transmission method according to an embodiment of the present application. This method may be applicable to the case where the paging mechanism of the first communication node in the inactive state is determined. This method may be implemented by software and/or hardware and integrated on a second communication node. The second communication node may be a base station. For the content that is not yet exhaustive in this embodiment, reference may be made to the preceding embodiments. Details are not described herein.

As shown in FIG. 3A, the information transmission method provided in this embodiment of the present application includes the following steps.

In S310, second paging information is acquired. The second paging information includes paging capability indication information of the first communication node.

In this step, the second paging information may be determined by the first paging information transmitted by a third communication node. The second paging information may be information transmitted by a central unit of the second communication node to a distribution unit of the second communication node based on the first paging information. The second paging information may be used for the second communication node to determine the paging occasion. The second paging information may also include the discontinuous reception cycle of the first communication node in an idle mode.

In S320, the paging occasion is determined according to the second paging information and capability information of the second communication node.

The capability information of the second communication node may represent the capability of whether the second communication node can compute a paging occasion index by using the discontinuous reception cycle of the first communication node in the idle mode.

When the paging occasion is determined, the capability information of the second communication node and the second paging information may determine parameters used in computing the paging occasion index. The specific content is not limited herein.

In the information transmission method provided in this embodiment of the present application, the second paging information is acquired, where the second paging information includes the paging capability indication information of the first communication node, and the paging occasion is determined according to the second paging information and the capability information of the second communication node. The paging mechanism in the inactive state is effectively determined by using this method.

On the basis of the preceding embodiments, variant embodiments of the preceding embodiments are proposed. It is to be noted here that for ease of description, only differences from the preceding embodiments are described in the variant embodiments.

In an embodiment, the paging capability indication information of the first communication node includes at least one of the following: capability indication information for computing a paging occasion index in the inactive state by using the discontinuous reception cycle of the first communication node in the idle mode or indication information about a capability of computing the paging occasion index in the inactive state.

In an embodiment, acquiring second paging information includes the following steps: the central unit of the second communication node acquires first paging information of the third communication node, where the first paging information includes the paging capability indication information of the first communication node, and the central unit of the second communication node transmits the second paging information to the distribution unit of the second communication node. The second paging information is determined according to the first paging information. The second paging information also includes the discontinuous reception cycle of the first communication node in the idle mode.

The second paging information includes the paging capability indication information in the first paging information and also the discontinuous reception cycle of the first communication node in the idle mode.

In an embodiment, in the case where the second paging information is acquired and the second communication node supports computing the paging occasion index in the inactive state, a paging occasion is determined according to the first number of paging times of one paging frame and the discontinuous reception cycle of the first communication node in the idle mode. The first number of paging times is determined according to the second paging information.

How to determine the first number of paging times and the paging occasion is not limited herein. In the embodiments of the present application, "first" and "second" are used for distinguishing corresponding contents and have no practical meaning.

In an embodiment, in the case where the second paging information is not acquired or the central unit of the second communication node does not support computing the paging occasion index in the inactive state or the paging capability indication information included in the second paging information is not acquired, a paging occasion is determined according to the second number of paging times of one paging frame of a conventional user equipment and the paging cycle of the conventional user equipment.

The conventional user equipment may be considered as not supporting the preceding capabilities, such as the capability of computing the paging occasion index in the inactive state.

In an embodiment, determining the paging occasion according to the second paging information and the capability information of the second communication node includes determining a paging occasion index according to the second paging information and the capability information of the second communication node and determining the paging occasion according to the paging occasion index.

When the paging occasion is determined, the paging occasion may be determined based on the paging occasion index in this embodiment. The paging occasion index is not limited herein as long as the paging occasion can be uniquely identified. How to determine the paging occasion index is also not limited herein. For example, the paging occasion index may be determined based on the number of paging times and the paging cycle. For the specific content, reference is made to the preceding description.

In an embodiment, the method also includes broadcasting the capability information of the second communication node.

In an embodiment, the capability information broadcast by the second communication node includes at least one of the following: capability indication information indicating whether the second communication node supports computing the paging occasion index by using the discontinuous reception cycle of the first communication node in the idle mode, or indication information about whether the second communication node supports the capability of computing the paging occasion index in the inactive state, or the specific information about the number of paging times of one paging frame of the first communication node for the second communication node to support computing a paging occasion index by using the discontinuous reception cycle of the first communication node in the idle mode. The manner in which the capability of the second communication node is indicated by the number of paging times may be considered as an implicit indication manner.

Exemplary Description of the Present Application is Made Below.

Currently, in the wireless communication standard, a UE may use discontinuous reception (DRX) in the idle mode to reduce power consumption. The DRX of the UE in the idle state is mainly to monitor a paging channel and a broadcast channel. As long as a fixed cycle is defined, the purpose of the discontinuous reception can be achieved. Determining a DRX cycle of paging is described as follows: if an upper layer configures a UE-specific extended DRX value of 512 radio frames, the DRX cycle of the UE is 512. Otherwise, the DRX cycle of the UE is determined by the shortest one between the UE-specific DRX value (if assigned by the upper layer) and a default DRX value broadcast in system information. If no UE-specific DRX is configured by the upper layer, the default value is applied. In the RRC_INACTIVE state, if the extended DRX is not configured by the upper layer, the DRX cycle of the UE is determined by the shortest one among a paging cycle of a RAN, a UE-specific paging cycle (if assigned by the upper layer), and a default paging cycle. Otherwise, in the case where the extended DRX is configured by the upper layer, in the RRC_INACTIVE state, the DRX cycle of the UE during a paging time window (PTW) is determined by the shortest one among the paging cycle of the RAN, the UE-specific paging cycle (if assigned by the upper layer) and the default paging cycle of the base station, and the DRX cycle of the UE outside of the PTW is determined by the paging cycle of the RAN.

Figure 3B:
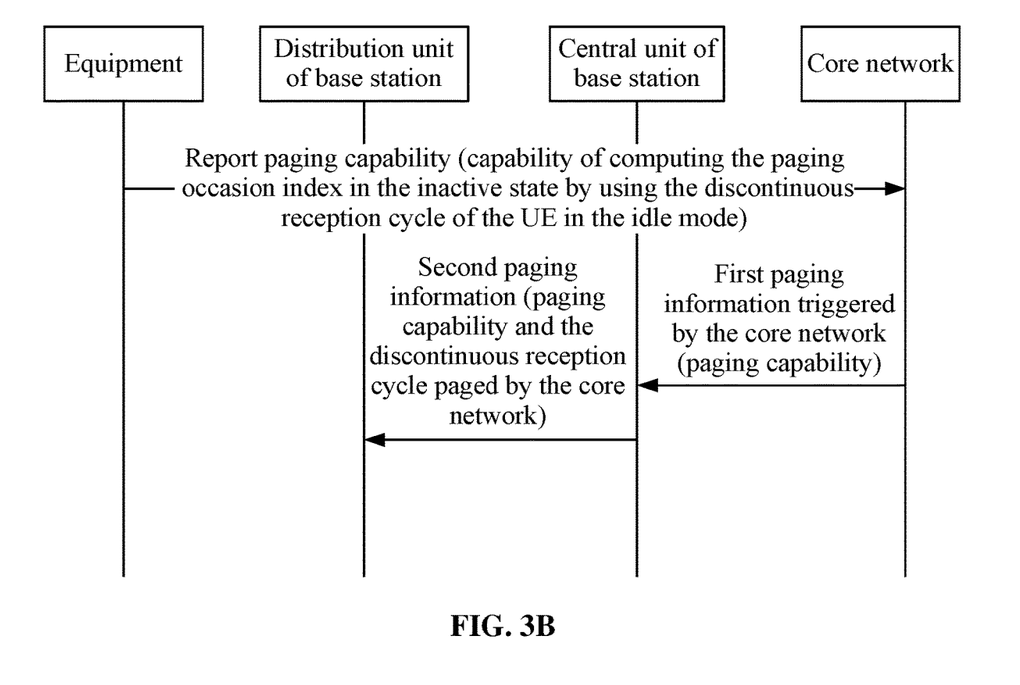
FIG. 3B is a diagram of computing a paging occasion index in an inactive state according to an embodiment of the present application.

There is no paging mechanism for the inactive RRC state in the current standard. FIG. 3B is a diagram of computing a paging occasion index in an inactive state according to an embodiment of the present application. Referring to FIG. 3B, equipment may be considered as the first communication node, a base station may be considered as the second communication node, and a core network may be considered as the third communication node.

The equipment reports paging capability through the paging capability indication information. The paging capability indication information performing a paging capability indication in the inactive state includes capability indication information for computing a paging occasion index by using the discontinuous reception (DRX) cycle of the UE in the idle mode when a paging occasion index (i_s) is computed in the inactive state, or indication information about the capability of computing the paging occasion index in the inactive state.

The indication information about the capability of computing the paging occasion index in the inactive state includes capability indication information for computing the paging occasion index by using the discontinuous reception (DRX) cycle of the UE in the idle mode when the paging occasion index (i_s) in the inactive state is greater than 1, or indication information about the capability of computing the paging occasion index when the paging occasion index (i_s) in the inactive state is greater than 1. When the paging occasion index (i_s) in the inactive state is greater than 1, the indication information about the capability of computing the paging occasion index indicates that the paging occasion index is computed through the discontinuous reception cycle of the UE in the idle mode.

When the core network sends the first paging information triggered by the core network to the base station, the paging capability indication information and the discontinuous reception cycle triggered by the core network are sent to the central unit of the base station. When the central unit of the base station receives the first paging information, the paging capability indication information and the discontinuous reception cycle triggered by the core network are sent to the distribution unit of the base station through second paging information. The discontinuous reception cycle triggered by the core network may be determined by the minimum cycle among a UE-specific paging cycle (if configured) and the default paging cycle of the base station. The default paging cycle may be broadcast by the base station. The discontinuous reception cycle triggered by the core network may be considered as the discontinuous reception cycle of the first communication node in the idle mode.

The base station informs the UE through broadcasting whether the base station supports computing the paging occasion index in the inactive state by using the discontinuous reception cycle of the UE in the idle mode. The information broadcast by the base station to the UE that whether the base station supports computing the paging occasion index in the inactive state by using the discontinuous reception cycle of the UE in the idle mode may be implicitly indicated or explicitly indicated.

For example, the number of paging times (for example, Ns-r17 of NR or nB-r17 of enhanced machine type communication (eMTC)) of one paging frame of the UE used for supporting the preceding capability is implicitly broadcast by the base station, which represents that the base station supports the preceding capability. Alternatively, whether the base station supports the preceding capability is explicitly indicated through information.

The value of the number of paging times is generally 2 or 4. For example, if the base station broadcasts through 1 bit, 0 represents that the number of paging times is 2, and 1 represents that the number of paging times is 4. If the broadcast does not include this 1 bit, this represents that the base station does not support the preceding capability.

In the case where the equipment supports the preceding capability (that is, the capability of computing the paging occasion index in the inactive state by using the discontinuous reception cycle of the UE in the idle mode), if the base station supports the preceding capability (that is, the capability of computing the paging occasion index in the inactive state by using the discontinuous reception cycle of the UE in the idle mode), when both paging initiated by the core network and paging initiated by a radio access network (RAN) are monitored simultaneously in the RRC_INACTIVE state, the paging occasion index (i_s) is computed by using the number of paging times broadcast by the base station and the discontinuous reception (DRX) cycle of the UE in the idle mode. The DRX cycle of the UE in the idle mode is determined by the minimum cycle among the UE-specific paging cycle (if configured) and the default paging cycle of the base station. Alternatively, in the case where the equipment supports the preceding capability, and when the paging initiated by the core network and the paging initiated by a radio access network are monitored simultaneously in the RRC_INACTIVE state, the paging occasion index (i_s) in the RRC_INACTIVE state is computed by using the discontinuous reception cycle of the UE in the idle mode. The discontinuous reception (DRX) cycle of the UE in the idle mode is determined by the minimum cycle among the UE-specific paging cycle (if configured) and the default paging cycle of the base station. Alternatively, in the case where the equipment in the RRC_INACTIVE state supports the preceding capability, the paging occasion is determined by using the paging occasion index in the idle mode, a paging narrowband index, and/or the group index of a wake-up signal group. The PNB is the narrowband index for receiving the paging message by the UE. Alternatively, in the case where the equipment in the RRC_INACTIVE state supports the preceding capability, the paging occasion index, the paging narrowband index, and the group index of the wake-up signal group are computed by using the discontinuous reception cycle of the UE in the idle mode. The PNB is the narrowband index for receiving the paging message by the UE.

In the case where the equipment or the base station does not support the preceding capability (that is, the capability of computing the paging occasion index in the inactive state by using the discontinuous reception cycle of the UE in the idle mode), and when paging initiated by the core network and paging initiated by the RAN are monitored simultaneously in the RRC_INACTIVE state, the paging occasion index (i_s) is computed by using the number of paging times (for example, Ns-r15 of NR or nB-r8 of eMTC) of one paging frame of a conventional UE and the paging cycle of the conventional UE. The paging cycle of the conventional UE is determined by the minimum cycle among a paging cycle of a RAN, the UE-specific paging cycle (if configured), and the default paging cycle.

Figure 4:
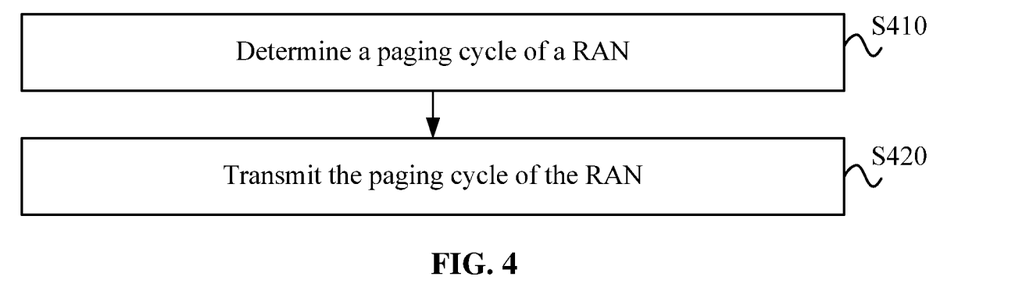
FIG. 4 is a flowchart of another information transmission method according to an embodiment of the present application.

In an example embodiment, FIG. 4 is a flowchart of another information transmission method according to an embodiment of the present application. This method may be applicable to the case where the paging cycle of the RAN is determined. This method may be executed by an information transmission apparatus. This method may be implemented by software and/or hardware and integrated on a second communication node or a third communication node. For the content that is not yet exhaustive in this embodiment, reference may be made to the preceding embodiments. Details are not described herein.

As shown in FIG. 4, the information transmission method provided in this embodiment of the present application includes the following steps.

In S410, a paging cycle of a RAN is determined.

The paging cycle of the RAN may be considered as a paging cycle configured by a base station to a UE through UE-dedicated signaling.

In S420, the paging cycle of the RAN is transmitted.

In this embodiment, it is not limited that the method may be executed by the second communication node if the second communication node transmits the paging cycle of the RAN to the third communication node. The method may also be executed by the third communication node if the third communication node transmits the paging cycle of the RAN to the second communication node. The paging cycle of the RAN is included in which information is not limited herein.

In the information transmission method provided in this embodiment of the present application, the paging cycle of the RAN is determined and then transmitted. The paging cycle of the RAN is effectively indicated by using the method.

On the basis of the preceding embodiments, variant embodiments of the preceding embodiments are proposed. It is to be noted here that for ease of description, only differences from the preceding embodiments are described in the variant embodiments.

In an embodiment, the method is applied to the second communication node. Transmitting the paging cycle of the RAN includes that, in the case where the second communication node configures the paging cycle of the RAN for the first communication node, the second communication node carries the paging cycle of the RAN on dedicated signaling of the first communication node to transmit the paging cycle of the RAN to the third communication node.

In an embodiment, the method is applied to the third communication node. Transmitting the paging cycle of the RAN includes that, in the case where the third communication node triggers paging, the third communication node carries the paging cycle of the RAN on the paging information triggered by the third communication node to transmit the paging cycle of the RAN to the second communication node, and the third communication node instructs the first communication node to send the paging according to the paging cycle of the RAN or the third communication node instructs the first communication node to send the paging according to the paging cycle of the RAN and the paging cycle of the third communication node.

Exemplary Description of the Present Application is Made Below.

Figure 3C:
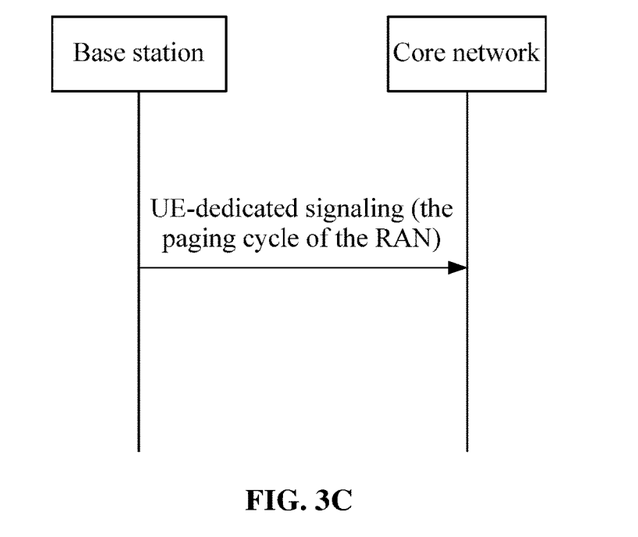
FIG. 3C is a flowchart for determining a paging cycle of a RAN according to an embodiment of the present application.
Figure 3D:
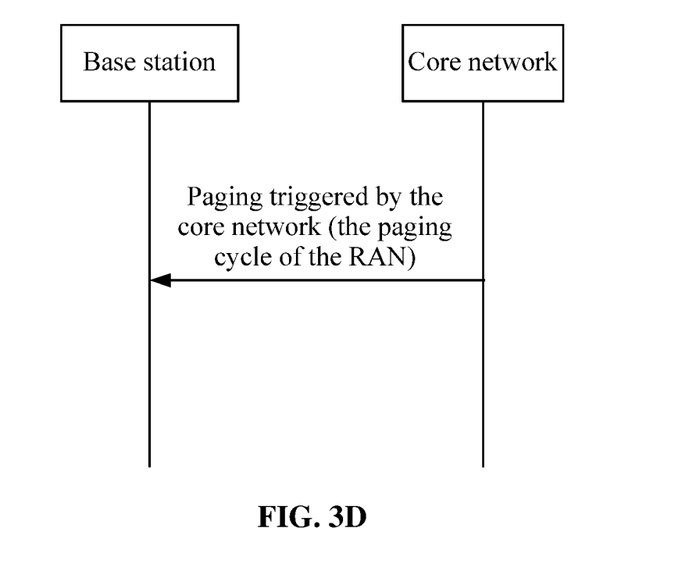
FIG. 3D is another flowchart for determining a paging cycle of a RAN according to an embodiment of the present application.

In this example, the paging triggered by a core network is sent on the paging occasion of a RAN and the paging occasion of the core network. FIG. 3C is a flowchart for determining the paging cycle of the RAN according to an embodiment of the present application. FIG. 3D is another flowchart for determining the paging cycle of the RAN according to an embodiment of the present application. Referring to FIG. 3C and FIG. 3D, a base station may be the second communication node, a core network may be the third communication node, and a UE may be the first communication node. When the base station configures the paging cycle of the RAN for the equipment, that is, the UE, the base station notifies the core network of the paging cycle of the RAN configured for the equipment through UE-dedicated signaling, that is, the dedicated signaling of the first communication node. The UE-dedicated signaling also includes at least one of the following: UE context release complete, UE context suspend request, or UE context resume request.

In the case where the paging is triggered by the core network, the core network includes the paging cycle of the RAN in the triggered paging information, that is, the paging information triggered by the third communication node, to send the base station. The base station sends the paging according to the paging cycle of the RAN. Alternatively, the base station sends the paging according to the paging cycle of the RAN and the paging cycle of the core network (CN) separately.

In an exemplary embodiment, this embodiment of the present application provides an information transmission method. This method may be applicable to the case of processing a context release command. This method may be executed by an information transmission apparatus. This apparatus may be executed by software and/or hardware and integrated on the second communication node. For the content that is not yet exhaustive in this embodiment, reference may be made to the preceding embodiments. Details are not described herein.

The information transmission method provided in this embodiment of the present application includes, in the case where a context release command of the first communication node sent by the third communication node is acquired and the first communication node is in the RRC_INACTIVE state, transmitting indication information.

The context release command of the first communication node may be considered as a command to release the context of the first communication node. The indication information may indicate that the context of the first communication node is retained, such as release of the context of the first communication node is rejected or the context of the first communication node is suspended.

In the information transmission method provided in this embodiment of the present application, in the case where the context release command of the first communication node sent by the third communication node is acquired and the first communication node is in the RRC_INACTIVE state, the indication information is transmitted. This effectively rejects the release of the context of the first communication node or suspends the context of the first communication node.

On the basis of the preceding embodiments, variant embodiments of the preceding embodiments are proposed. It is to be noted here that for ease of description, only differences from the preceding embodiments are described in the variant embodiments.

In an embodiment, the indication information includes at least one of the following: a context release reject message of the first communication node, indication information indicating that the first communication node is in the RRC_INACTIVE state, or indication information of suspending one context of the first communication node.

The context of the first communication node is rejected or suspended through the indication information.

In an embodiment, the indication information indicating that the first communication node is in the RRC_INACTIVE state or the indication information of suspending the one context of the first communication node is included in at least one of the following: context release complete information of the first communication node or context suspend request information of the first communication node.

Figure 5:
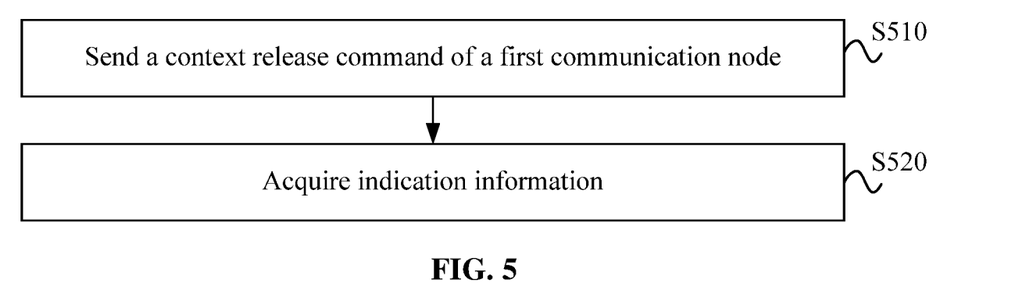
FIG. 5 is a flowchart of another information transmission method according to an embodiment of the present application.

In an exemplary embodiment, an embodiment of the present application provides an information transmission method. FIG. 5 is a flowchart of another information transmission method according to an embodiment of the present application. This method is applicable to the case of processing a context release command. This method may be executed by an information transmission apparatus. This apparatus may be implemented by software and/or hardware and integrated on the third communication node. For the content that is not yet exhaustive in this embodiment, reference may be made to the preceding embodiments. Details are not described herein.

As shown in FIG. 5, the information transmission method provided in this embodiment of the present application includes the following steps.

In S510, a context release command of a first communication node is sent.

The third communication node may send the context release command of the first communication node to the first communication node.

In S520, indication information is acquired.

After the context release command of the first communication node is sent, the indication information may be acquired. The indication information indicates that release of the context of the first communication node is rejected or the context of the first communication node is suspended.

After the indication information is acquired, the context of the first communication node may be correspondingly processed based on the indication information, such as performing an operation of suspending the context of the first communication node.

The information transmission method provided by the present application sends the context release command of the first communication node and acquires the indication information. This effectively rejects the release of the context of the first communication node or suspends the context of the first communication node.

On the basis of the preceding embodiments, variant embodiments of the preceding embodiments are proposed. It is to be noted here that for ease of description, only differences from the preceding embodiments are described in the variant embodiments.

In an embodiment, the indication information includes at least one of the following: a context release reject message of the first communication node, indication information indicating that the first communication node is in the RRC_INACTIVE state, or indication information of suspending one context of the first communication node.

The indication information indicating that the first communication node is in the RRC_INACTIVE state or the indication information of suspending the one context of the first communication node is included in at least one of the following: context release complete information of the first communication node or context suspend request information of the first communication node.

Exemplary Description of the Present Application is Made Below.

Figure 3E:
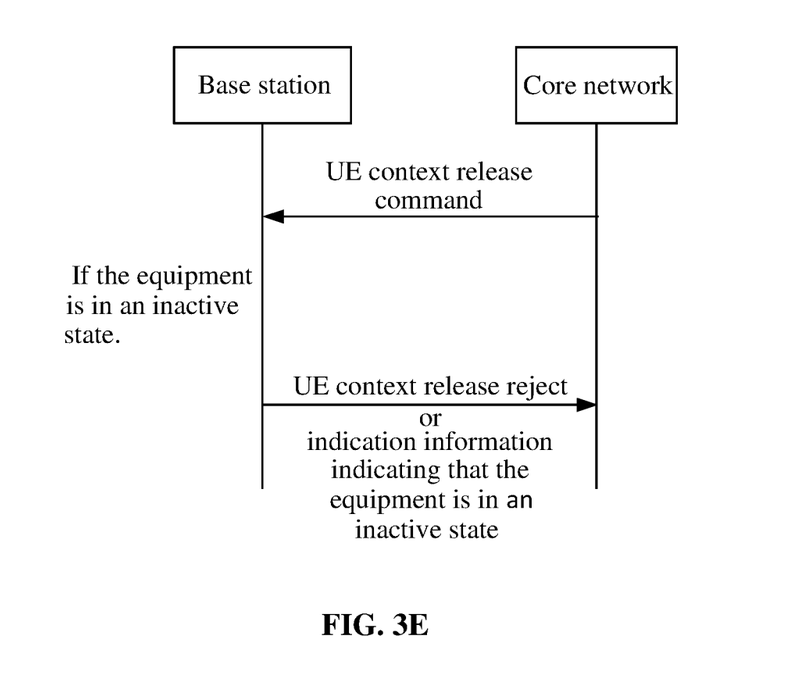
FIG. 3E is a diagram of processing a UE context release command according to an embodiment of the present application.

FIG. 3E is a diagram of processing a UE context release command according to an embodiment of the present application. Referring to FIG. 3E, a base station may be the second communication node, a UE may be the first communication node, and a core network may be the third communication node. When the base station receives a UE context release command sent by the core network, that is, the context release command of the first communication node, if the equipment is in the RRC_INACTIVE state, a UE context release reject message is sent to the core network; or indication information indicating that the UE is in the RRC_INACTIVE state is sent to the core network; or indication information of suspending one context of the UE is sent to the core network so that the core network does not release the context of the UE, thereby not triggering paging of the core network.

The UE context release reject message or the indication information of suspending the one context of the UE is included in at least one of the following: UE context release complete information or UE context suspend request information.

The base station and the core network save the context of the UE after sending or receiving the indication. When the core network needs to send data to the UE, a UE context resume request is sent to the base station to resume the context of the UE.

Figure 6:
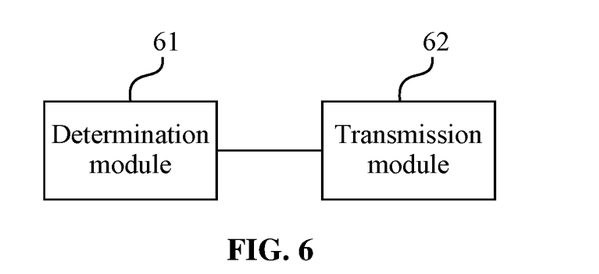
FIG. 6 is a diagram illustrating the structure of an information transmission apparatus according to an embodiment of the present application.

In an exemplary embodiment, the present application provides an information transmission apparatus. FIG. 6 is a diagram illustrating the structure of an information transmission apparatus according to an embodiment of the present application. This apparatus may be configured in the first communication node. This apparatus includes a determination module 61 and a transmission module 62.

The determination module 61 is configured to determine paging capability indication information. The paging capability indication information indicates paging capability of the first communication node in an inactive state.

The transmission module 62 is configured to transmit the paging capability indication information.

The information transmission apparatus provided in this embodiment is configured to implement the information transmission method of the embodiment shown in FIG. 1. The information transmission apparatus provided in this embodiment has similar implementation principles and technical effects to the information transmission method of the embodiment shown in FIG. 1. Repetition is not made here.

On the basis of the preceding embodiments, variant embodiments of the preceding embodiments are proposed. It is to be noted here that for ease of description, only differences from the preceding embodiments are described in the variant embodiments.

In an embodiment, the paging capability of the first communication node in the inactive state includes at least one of the following: a capability of computing a paging occasion index in the inactive state by using the discontinuous reception cycle of the first communication node in an idle mode or the capability of computing a paging occasion index in the inactive state.

In an embodiment, the capability of computing the paging occasion index in the inactive state includes, in the case where the paging occasion index in the inactive state is greater than 1, a capability of computing the paging occasion index by using the discontinuous reception cycle of the first communication node in the idle mode, or, in the case where the paging occasion index in the inactive state is greater than 1, the capability of computing the paging occasion index.

In an embodiment, the discontinuous reception cycle of the first communication node in the idle mode is determined by the minimum cycle among a specific paging cycle of the first communication node and a default paging cycle of a second communication node.

Figure 7:
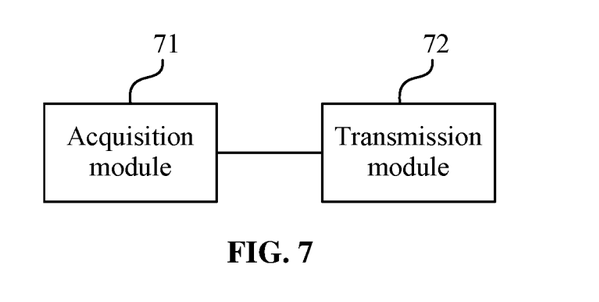
FIG. 7 is a diagram illustrating the structure of another information transmission apparatus according to an embodiment of the present application.

In an example embodiment, the present application provides an information transmission apparatus. FIG. 7 is a diagram illustrating the structure of another information transmission apparatus according to an embodiment of the present application. This apparatus is configured in a third communication node. As shown in FIG. 7, this apparatus includes an acquisition module 71 and a transmission module 72.

The acquisition module 71 is configured to acquire paging capability indication information. The paging capability indication information indicates paging capability of a first communication node in an inactive state.

The transmission module 72 is configured to transmit first paging information. The first paging information includes the paging capability indication information.

The information transmission apparatus provided in this embodiment is configured to implement the information transmission method of the embodiment shown in FIG. 2. The information transmission apparatus provided in this embodiment has similar implementation principles and technical effects to the information transmission method of the embodiment shown in FIG. 2. Repetition is not made here.

On the basis of the preceding embodiments, variant embodiments of the preceding embodiments are proposed. It is to be noted here that for ease of description, only differences from the preceding embodiments are described in the variant embodiments.

In an embodiment, the paging capability of the first communication node in the inactive state includes at least one of the following: a capability of computing a paging occasion index in the inactive state by using the discontinuous reception cycle of the first communication node in an idle mode or the capability of computing a paging occasion index in the inactive state.

Figure 8:
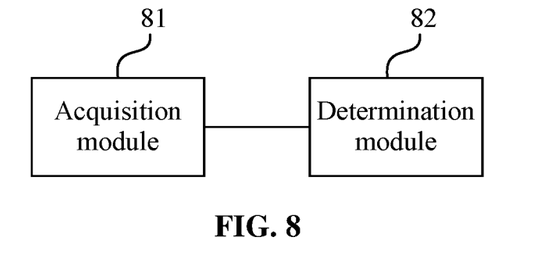
FIG. 8 is a diagram illustrating the structure of another information transmission apparatus according to an embodiment of the present application.

In an example embodiment, the present application provides an information transmission apparatus. FIG. 8 is a diagram illustrating the structure of another information transmission apparatus according to an embodiment of the present application. This apparatus may be configured in a second communication node. This apparatus includes an acquisition module 81 and a determination module 82.

The acquisition module 81 is configured to acquire second paging information. The second paging information includes paging capability indication information of a first communication node.

The determination module 82 is configured to determine a paging occasion according to the second paging information and capability information of the second communication node.

The information transmission apparatus provided in this embodiment is configured to implement the information transmission method of the embodiment shown in FIG. 3A. The information transmission apparatus provided in this embodiment has similar implementation principles and technical effects to the information transmission method of the embodiment shown in FIG. 3A. Repetition is not made here.

On the basis of the preceding embodiments, variant embodiments of the preceding embodiments are proposed. It is to be noted here that for ease of description, only differences from the preceding embodiments are described in the variant embodiments.

In an embodiment, the paging capability indication information of the first communication node includes at least one of the following: capability indication information for computing a paging occasion index in the inactive state by using the discontinuous reception cycle of the first communication node in an idle mode or indication information about a capability of computing a paging occasion index in the inactive state.

In an embodiment, the acquisition module 81 is configured to acquire the second paging information in the following manner, acquiring first paging information of a third communication node by a central unit of the second communication node, where the first paging information includes the paging capability indication information of the first communication node, and transmitting the second paging information by the central unit of the second communication node to a distribution unit of the second communication node. The second paging information is determined according to the first paging information. The second paging information also includes the discontinuous reception cycle of the first communication node in the idle mode.

In an embodiment, in the case where the second paging information is acquired and the second communication node supports computing a paging occasion index in the inactive state, a paging occasion is determined according to the first number of paging times of one paging frame and the discontinuous reception cycle of the first communication node in the idle mode. The first number of paging times is determined according to the second paging information.

In an embodiment, in the case where the first paging information is not acquired or the central unit of the second communication node does not support computing a paging occasion index in the inactive state or the paging capability indication information included in the first paging information is not acquired, the paging occasion is determined according to the second number of paging times of one paging frame of a conventional user equipment and the paging cycle of the conventional user equipment.

In an embodiment, the determination module 82 is configured to determine the paging occasion according to the second paging information and the capability information of the second communication node in the following manner determining a paging occasion index according to the second paging information and the capability information of the second communication node and determining the paging occasion according to the paging occasion index.

In an embodiment, the apparatus further includes a broadcast module configured to broadcast capability information of the second communication node.

In an embodiment, the capability information broadcast by the broadcast module includes at least one of the following: capability indication information indicating whether the second communication node supports computing the paging occasion index by using the discontinuous reception cycle of the first communication node in the idle mode, about computing the paging occasion index in the inactive state whether supported by a second communication node, or the specific information about the number of paging times of one paging frame of the first communication node for the second communication node to support computing a paging occasion index by using the discontinuous reception cycle of the first communication node in the idle mode.

Figure 9:
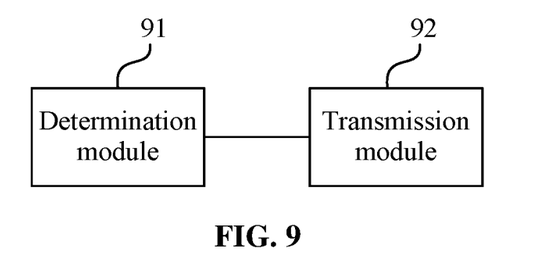
FIG. 9 is a diagram illustrating the structure of another information transmission apparatus according to an embodiment of the present application.

In an exemplary embodiment, the present application provides an information transmission apparatus. FIG. 9 is a diagram illustrating the structure of another information transmission apparatus according to an embodiment of the present application. This apparatus may be integrated on the second communication node or the third communication node. This apparatus includes a determination module 91 and a transmission module 92.

The determination module 91 is configured to determine a paging cycle of a RAN.

The transmission module 92 is configured to transmit the paging cycle of the RAN.

The information transmission apparatus provided in this embodiment is configured to implement the information transmission method of the embodiment shown in FIG. 4. The information transmission apparatus provided in this embodiment has similar implementation principles and technical effects to the information transmission method of the embodiment shown in FIG. 4. Repetition is not made here.

On the basis of the preceding embodiments, variant embodiments of the preceding embodiments are proposed. It is to be noted here that for ease of description, only differences from the preceding embodiments are described in the variant embodiments.

In an embodiment, the apparatus is applied by a second communication node. The transmission module 92 is configured to transmit the paging cycle of the RAN in the following manner, in the case where the second communication node configures the paging cycle of the RAN for the first communication node, carrying the paging cycle of the RAN on dedicated signaling of the first communication node by the second communication node to transmit the paging cycle of the RAN to the third communication node.

In an embodiment, the apparatus is applied by a third communication node. The transmission module 92 is configured to transmit the paging cycle of the RAN in the following manner, in the case where the third communication node triggers paging, the third communication node carrying the paging cycle of the RAN on the paging information triggered by the third communication node to transmit the paging cycle of the RAN to a second communication node, and instructing the first communication node to send the paging according to the paging cycle of the RAN or instructing the first communication node to send the paging according to the paging cycle of the RAN and the paging cycle of the third communication node.

In an exemplary embodiment, the present application provides an information transmission apparatus. This apparatus may be integrated on the second communication node. This apparatus is configured to, in the case where a context release command of a first communication node sent by a third communication node is acquired and the first communication node is in the RRC_INACTIVE state, transmit indication information.

The information transmission apparatus provided in this embodiment is configured to implement the information transmission method of transmitting the indication information in the present application. The information transmission apparatus provided in this embodiment has similar implementation principles and technical effects to the information transmission method transmitting indication information. Repetition is not made here.

On the basis of the preceding embodiments, variant embodiments of the preceding embodiments are proposed. It is to be noted here that for ease of description, only differences from the preceding embodiments are described in the variant embodiments.

In an embodiment, the indication information includes at least one of the following: a context release reject message of the first communication node, indication information indicating that the first communication node is in the RRC_INACTIVE state, or indication information of suspending one context of the first communication node.

In an embodiment, the indication information indicating that the first communication node is in the RRC_INACTIVE state or the indication information of suspending the one context of the first communication node is included in at least one of the following: context release complete information of the first communication node or context suspend request information of the first communication node.

Figure 10:
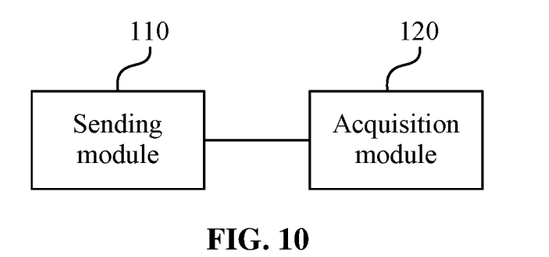
FIG. 10 is a diagram illustrating the structure of another information transmission apparatus according to an embodiment of the present application.

In an exemplary embodiment, the present application provides an information transmission apparatus. FIG. 10 is a diagram illustrating the structure of another information transmission apparatus according to an embodiment of the present application. This apparatus may be integrated on a third communication node. As shown in FIG. 10, this apparatus includes a sending module 110 and an acquisition module 120.

The sending module 110 is configured to send a context release command of a first communication node.

The acquisition module 120 is configured to acquire indication information.

The information transmission apparatus provided in this embodiment is configured to implement the information transmission method of the embodiment shown in FIG. 5. The information transmission apparatus provided in this embodiment has similar implementation principles and technical effects to the information transmission method of the embodiment shown in FIG. 5. Repetition is not made here.

On the basis of the preceding embodiments, variant embodiments of the preceding embodiments are proposed. It is to be noted here that for ease of description, only differences from the preceding embodiments are described in the variant embodiments.

In an embodiment, the indication information includes at least one of the following: a context release reject message of the first communication node, indication information indicating that the first communication node is in the RRC_INACTIVE state, or indication information of suspending one context of the first communication node.

The indication information indicating that the first communication node is in the RRC_INACTIVE state or the indication information of suspending the one context of the first communication node is included in at least one of the following: context release complete information of the first communication node or context suspend request information of the first communication node.

Figure 11:
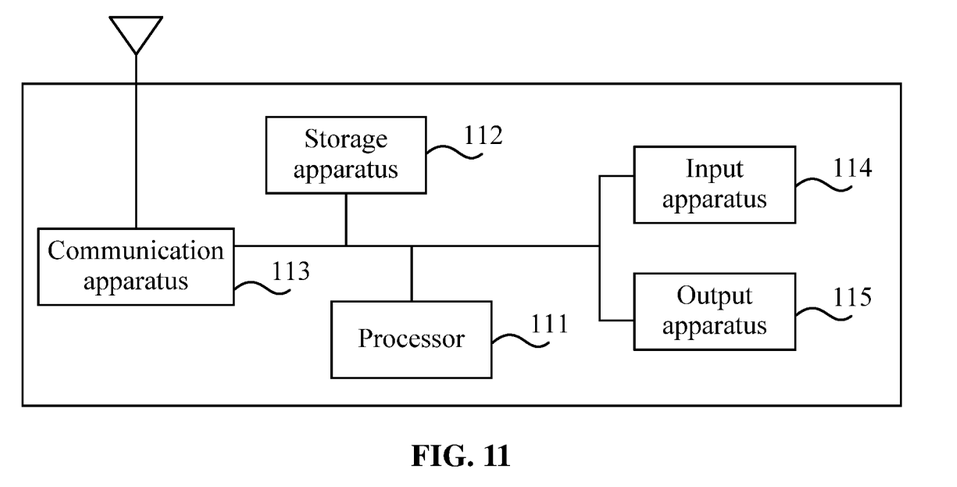
FIG. 11 is a diagram illustrating the structure of a communication node according to an embodiment of the present application.

In an exemplary embodiment, the present application provides a communication node. The communication node in this embodiment may be a first communication node, a second communication node, or a third communication node in the present application. FIG. 11 is a diagram illustrating the structure of a communication node according to an embodiment of the present application. As shown in FIG. 11, the communication node provided in the present application includes one or more processors 111 and a storage apparatus 112. One or more processors 111 may be disposed in the communication node. In FIG. 11, one processor 111 is used as an example. The storage apparatus 112 is used for storing one or more programs. When executed by the one or more processors 111, the one or more programs cause the one or more processors 111 to implement the information transmission method described in embodiments of the present application.

The communication node also includes a communication apparatus 113, an input apparatus 114, and an output apparatus 115.

The processor 111, the storage apparatus 112, the communication apparatus 113, the input apparatus 114, and the output apparatus 115 in the communication node may be connected via a bus or other manners, with connection via a bus as an example in FIG. 11.

The input apparatus 114 may be configured to receive inputted digital or character information and generate key signal input related to user settings and function control of the communication node. The output apparatus 115 may include a display device such as a display screen.

The communication apparatus 113 may include a receiver and a sender. The communication apparatus 113 is configured to perform information transceiving communication under the control of the processor 111.

As a computer-readable storage medium, the storage apparatus 112 may be configured to store software programs and computer-executable programs and modules, such as program instructions/modules (for example, the determination module 61 and the transmission module 62 in the information transmission apparatus; the acquisition module 71 and the transmission module 72 in the information transmission apparatus; the acquisition module 81 and the determination module 82 in the information transmission apparatus; the determination module 91 and the transmission module 92 in the information transmission apparatus; or the sending module 110 and the acquisition module 120 in the information transmission apparatus) corresponding to the information transmission method in the embodiments of the present application. The storage apparatus 112 may include a program storage region and a data storage region. The program storage region may store an operating system and an application program required by at least one function. The data storage region may store data created depending on use of the communication node. Additionally, the storage apparatus 112 may include a high-speed random-access memory and may also include a nonvolatile memory, such as at least one magnetic disk memory, a flash memory, or another nonvolatile solid-state memory. In some examples, the storage apparatus 112 may further include memories which are remotely disposed with respect to the processor 111. These remote memories may be connected to the communication node via a network. Examples of the preceding network include, but are not limited to, the Internet, an intranet, a local area network, a mobile communication network, and a combination thereof.

An embodiment of the present application also provides a storage medium storing a computer program, and the computer program, when executed by a processor, implements any method in the present application. The storage medium storing a computer program which, when executed by a processor, implements the information transmission method in any embodiment of the present application.

In an example, the information transmission method includes determining paging capability indication information, where the paging capability indication information indicates the paging capability of a first communication node in an inactive state, and transmitting the paging capability indication information.

In an example, the information transmission method includes acquiring paging capability indication information, where the paging capability indication information indicates the paging capability of a first communication node in an inactive state, and transmitting first paging information, where the first paging information includes the paging capability indication information.

In an example, the information transmission method includes acquiring second paging information, where the second paging information includes paging capability indication information of a first communication node, and determining a paging occasion according to the second paging information and capability information of a second communication node.

In an example, the information transmission method includes determining a paging cycle of a RAN and transmitting the paging cycle of the RAN.

In an example, the information transmission method includes transmitting indication information, in response to acquiring a context release command of a first communication node sent by a third communication node and the first communication node being in an RRC_INACTIVE state.

In an example, the information transmission method includes sending a context release command of a first communication node and acquiring indication information.

The computer storage medium in this embodiment of the present application may use any combination of one or more computer-readable mediums. A computer-readable medium may be a computer-readable signal medium or a computer-readable storage medium. The computer-readable storage medium may be, for example, but is not limited to, an electrical, magnetic, optical, electromagnetic, infrared, or semiconductor system, apparatus or device, or any combination thereof. More specific examples of the computer-readable storage medium include (non-exhaustive list) an electrical connection having one or more wires, a portable computer magnetic disk, a hard disk, a random-access memory (RAM), a read-only memory (ROM), an erasable programmable read-only memory (EPROM), a flash memory, an optical fiber, a portable compact disc (CD) ROM, an optical storage element, a magnetic storage device, or any suitable combination thereof.

The computer-readable storage medium may be any tangible medium containing or storing a program. The program may be used by or used in conjunction with an instruction execution system, apparatus, or element.

The computer-readable signal medium may include a data signal propagated in a baseband or as part of a carrier. The data signal carries computer-readable program codes. The data signal propagated in this manner may be in multiple forms and includes, but is not limited to, an electromagnetic signal, an optical signal, or any suitable combination thereof. The computer-readable signal medium may also be any computer-readable medium other than a computer-readable storage medium. The computer-readable medium may send, propagate, or transmit the program used by or used in conjunction with the instruction execution system, apparatus, or element.

The program codes contained on the computer-readable medium may be transmitted on any suitable medium including, but not limited to, a wireless medium, a wire, an optical cable, and a radio frequency (RF) or transmitted on any suitable combination thereof.

Computer program codes for executing operations of the present application may be written in one or more programming languages or a combination of multiple programming languages. The programming languages include object-oriented programming languages such as Java, Smalltalk, and C++ and conventional procedural programming languages such as C language or similar programming languages. The program codes may be executed entirely on a user computer, partly on the user computer, as a stand-alone software package, partly on the user computer and partly on a remote computer, or entirely on the remote computer or a server. In the case relating to a remote computer, the remote computer may be connected to a user computer via any kind of network including a local area network (LAN) or a wide area network (WAN), or may be connected to an external computer (for example, via the Internet through an Internet service provider).

The storage medium may be a non-transitory storage medium.

The above are only example embodiments of the present application and are not intended to limit the scope of the present application.

It is to be understood by those skilled in the art that the term "user equipment" covers any suitable type of radio user equipment, for example, a mobile phone, a portable data processing apparatus, a portable web browser, or a vehicle-mounted mobile station.

In general, multiple embodiments of the present application may be implemented in hardware, dedicated circuits, software, logic, or any combination thereof. For example, some aspects may be implemented in hardware, and other aspects may be implemented in firmware or software that may be executed by a controller, a microprocessor, or another computing apparatus, though the present application is not limited thereto.

The embodiments of the present application may be implemented by computer program instructions executed by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules, and functions, or may represent a combination of program steps with logic circuits, modules, and functions. Computer programs may be stored in a memory. The memory may be of any type suitable for a local technical environment and may be implemented by using any suitable data storage technology, such as, but not limited to, a read-only memory (ROM), a random access memory (RAM), and an optical memory apparatus and system (digital video disc (DVD) or compact disk (CD)). The computer-readable medium may include a non-transitory storage medium. The data processor may be in any type suitable for the local technical environment, for example, but not limited to, a general-purpose computer, a special-purpose computer, a microprocessor, a digital signal processing (DSP), an application specific integrated circuit (ASIC), a field-programmable gate array (FGPA), and a processor based on a multi-core processor architecture.

Detailed description of exemplary embodiments of the present application has been provided in the preceding through exemplary and non-restrictive examples. However, considering the drawings and the claims, various modifications and adjustments to the preceding embodiments are obvious to those skilled in the art but do not deviate from the scope of the present application. Accordingly, the proper scope of the present application is determined according to the claims.

What is claimed is:

1. An information transmission method, comprising:
   transmitting, by a first communication node, a paging capability indication information indicating a paging capability of the first communication node when in an inactive state, that comprises a capability of computing a paging occasion index in the inactive state by using a discontinuous reception cycle of the first communication node in an idle mode.

2. The method of claim 1, wherein the first communication node is a user equipment (UE).

3. The method of claim 1, further comprising:
   receiving a capability information, transmitted by a second communication node, wherein the capability information includes a capability indication information indicating that the second communication node supports computing the paging occasion index based on the discontinuous reception cycle of the first communication node in the idle mode.

4. The method of claim 3, wherein the second communication node is a base station (BS) in a network.

5. The method of claim 3, further comprising:
   monitoring at least one paging occasions when the first communication node is in the inactive state.

6. The method of claim 5, further comprising
   determining the paging occasion index based on at least one of 1) a number of paging times broadcast in the capability information, or 2) the discontinuous reception cycle.

7. An information transmission method, comprising:
   acquiring, by a second communication node, a paging information that comprises paging capability indication information, of a first communication node, comprising a capability indication information for computing a paging occasion index in an inactive state by using a discontinuous reception cycle of the first communication node in an idle mode; and
   determining a paging occasion according to the paging information and capability information of the second communication node.

8. The method of claim 7, wherein the second communication node is a base station (BS) in a network.

9. The method of claim 7, wherein the first communication node is a UE.

10. The method of claim 7, further comprising:
    broadcasting the capability information of the second communication node.

11. The method of claim 7, wherein the capability information broadcast by the second communication node comprises the capability indication information for computing the paging occasion index by using the discontinuous reception cycle of the first communication node in the idle mode when the paging occasion index is computed in the inactive state.

12. A communication apparatus, comprising a processor configured to:
    transmit, by a first communication node, a paging capability indication information indicating a paging capability of the first communication node when in an inactive state, that comprises a capability of computing a paging occasion index in the inactive state by using a discontinuous reception cycle of the first communication node in an idle mode.

13. The apparatus of claim 12, wherein the first communication node is a user equipment (UE).

14. The apparatus of claim 12, wherein the processor is further configured to:
    receive a capability information, transmitted by a second communication node, wherein the capability information includes a capability indication information indicating that the second communication node supports computing the paging occasion index based on the discontinuous reception cycle of the first communication node in the idle mode.

15. The apparatus of claim 14, wherein the second communication node is a base station (BS) in a network.

16. The apparatus of claim 14, wherein the processor is further configured to:
    monitor at least one paging occasions when the first communication node is in the inactive state.

17. The apparatus of claim 16, wherein the processor is further configured to:
    determine the paging occasion index based on at least one of 1) a number of paging times broadcast in the capability information, or 2) the discontinuous reception cycle.

18. A communication apparatus, comprising a processor configured to:
    acquire, by a second communication node, a paging information that comprises paging capability indication information, of a first communication node, comprising a capability indication information for computing a paging occasion index in an inactive state by using a discontinuous reception cycle of the first communication node in an idle mode; and
    determine a paging occasion according to the paging information and capability information of the second communication node.

19. The apparatus of claim 18, wherein the second communication node is a base station (BS) in a network.

* * * * *